Nov. 2, 1926. 1,605,405
F. W. HOCHSTETTER
PHONOGRAPH SOUND TRANSMITTER
Filed May 1, 1923
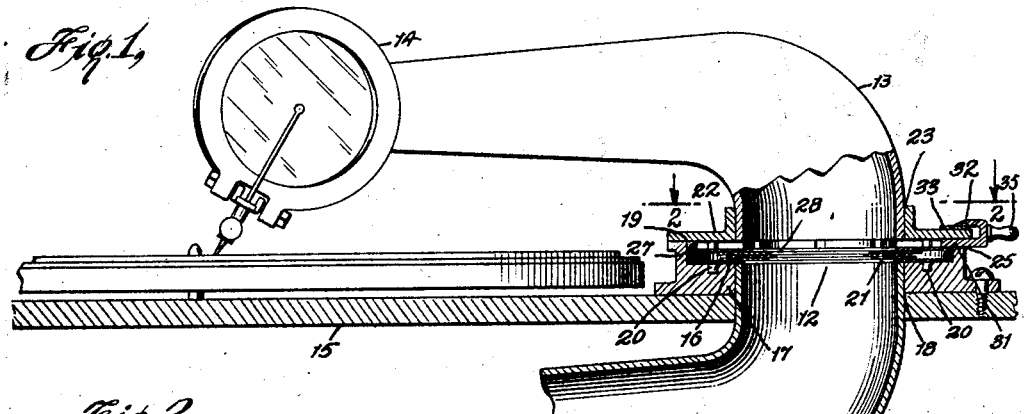
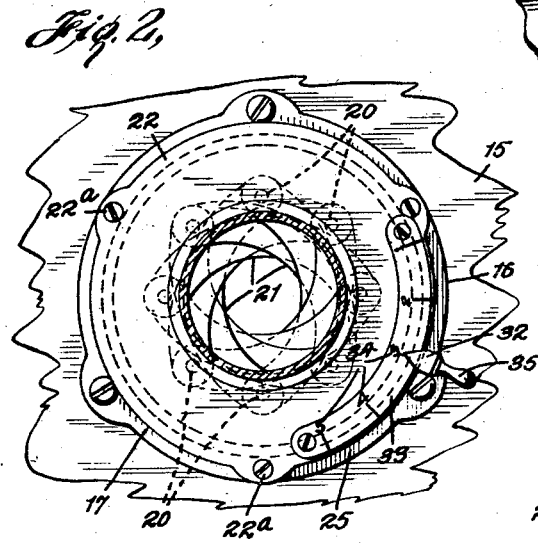
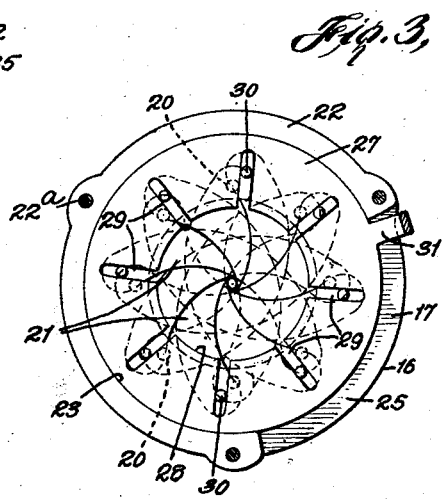
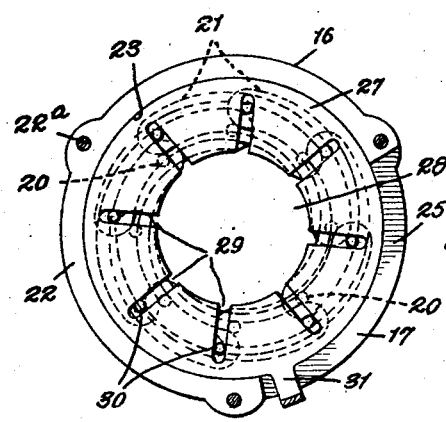
INVENTOR
Frederick W. Hochstetter
BY
W. T. Criswell
ATTORNEY Patented Nov. 2, 1926.

1,605,405

UNITED STATES PATENT OFFICE.

FREDERICK W. HOCHSTETTER, OF DAYTON, OHIO.

PHONOGRAPH SOUND TRANSMITTER.

Application filed May 1, 1923. Serial No. 635,910.

This invention relates to a class of devices adapted to be used in conjunction with phonograph and other like machines.

My invention has for its object primarily to provide a device or transmitter designed to be employed especially on a phonograph or other talking machine whereby the sound aero-impulses received in the transmitter from the reproducer when a record of musical composition or other subject matter is played may be regulated to allow the listeners to hear the rendition of the subject matter in low, medium or loud tones as desired, and which is of a form tending to clarify the tones by causing foreign noise in the transmitter to be partly or entirely cut-out of the course of transmission of the subject matter. The invention consists essentially of the provision of controlling means across the passage of the sound transmitter between its outlet and the reproducer of a phonograph, and this controlling means is expansibly and contractibly adjustable for enlarging and reducing circumferentially the course through the transmitter whereby the volume of sound aero-impulses from the reproducer when the subject matter of a record is played may be regulated so that the subject matter may be rendered in variable tones.

A further object of the invention is to provide a sound transmitter for a phonograph of simple and efficient construction which may be made in suitable sizes and shapes.

With these and other objects in view, the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is a fragmentary view, partly sectional and partly in elevation, showing the upper parts of a phonograph with one form of my improved sound transmitter applied thereto.

Fig. 2 is an enlarged fragmentary view showing a plan, partly in section, taken on the line 2—2 of Fig. 1.

Fig. 3 is an enlarged plan, partly in section, of the controller of the device and which shows its blades in closed positions, and Fig. 4 is an enlarged plan, partly in section, of the controller and which shows its blades in open positions.

The device has a sound transmitter or amplifier, as 10, which may be of any well-known or preferred form having a tapered annular wall 11 for projecting in magnified volume sound areo-impulses as is incident to the use of this class of devices, and the illustrative type of the device shown in the drawing has the reduced end or inlet 12 of the wall 11 leading from the tone-arm, as 13, which carries the reproducer, as 14, of a phonograph, as 15.

In the inlet end 12 of the wall of the transmitter 10 is a controller, as 16, which is operative for reducing and enlarging circumferentially the course of transmission of the sound aero-impulses from the reproducer 14 and tone-arm 13 whereby the volume of the subject matter may be rendered in clear and distinct low, medium or loud tones. The controller 16 preferably includes an annular supporting plate 17 which is disposed around the wall of the inlet of the transmitter, and this plate is suitably fastened to the phonograph or transmitter, against movement. The center of the opening 18 of the plate is disposed on a line corresponding with the center of the passage of the transmitter, and in once face of the plate surrounding the opening 18 is a circular recess 19. To spaced parts of the annular supporting plate 17 corresponding to the bottom of the recess 19 is pivoted, at 20, one of the ends of a number of blades 21 of like sizes and shapes, and these blades are in the forms of substantially semi-circular flat bars or plates of curvatures approximately similar to the curvature of the edge of the opening 18 of the supporting plate. I prefer to employ eight of these arcuate blades, and their pivots are spaced at equal distances surrounding the opening 18 to allow the other portions of the blades to be swung in unison back and forth in lapping positions across the opening 18 and concentrically relative to the center of the opening as well as relative to the center of the passage through the transmitter for enlarging and reducing circumferentially the course through the transmitter. The blades 21 are also of widths and lengths so that when swung to their maximum distances toward the center of the opening 18 of the annular supporting plate the passage through this opening and through the inlet of the transmitter will be substantially closed for cutting-off the transmission of waves of sound impulses from the reproducer and from the tone-arm. When the blades are reversely adjusted the passage through the opening of the supporting plate will be enlarged accordingly for allowing proportionate volumes of the waves of sound impulses to be transmitted through the opening of the supporting plate and through the transmitter for projection in low, medium or loud tones. Surrounding the inlet 12 of the transmitter and on the tone arm 13 of the phonograph is a plate 22 which is fastened at 22ª, to the plate 17, and the plate 22 is disposed so that it laps upon the recessed face of the supporting plate 17. The plate 22 is also annular in form to provide in its center a circular opening 23 of a size similar to the diameter of the circular opening 18 of the supporting plate. Leading from the recess 19 through part of the edge of the plate 17 is a slot 25.

For the purpose of enabling the blades 21 to be adjustably moved in unison crosswise toward and from the centers of the openings 18 and 23 of the plates 17 and 22, in the communicating recess 19 is a circular disk 27 which is rotative on the blades 21, and this disk is annular to provide in its center a circular opening 28 of a diameter similar to the diameter of the opening 18 of the supporting plate 17. In equidistant parts of the edge of the opening 28 of the disk 27 are radially disposed slots 29 in each of which is slidably and rotatably disposed a pin 30 protruding from the second end of each of the blades 21 so that the disk 27 when adjustably rotated accordingly the blades 21 will be simultaneously swung in clockwise relation to and from the centers of the openings of the plates 17, 22 and disk 27 for controlling the path of the passages through these openings and through the transmitter 10 for enlarging and reducing the circumference of the course of transit of the waves of sound aero-impulses to regulate the volume of sound impulses whereby the subject matter of the record of the phonograph may be rendered in low, medium or loud tones as desired. The operation of the blades in this manner will also tend to cut-out in part or in entirety the extraneous noise from the waves of sound, and in turn the subject matter will be rendered in clear and distant tones. On part of the edge of the disk 27 is a bar or arm 31 which movably extends through the slot 25 of the plate 17, and on the outer end of the arm 31 may be a pointer 32 which is bent over in movable spaced arrangement relative to the exterior of the wall of the transmitter. Crosswise of the exterior of the wall of the transmitter under the pointer 32 is a scale, as 33, having spaced indicating symbols preferably in the form of numerals, as 34, for indicating the various adjustments of the blades 21. There may be five of these numerals, all of which are spaced at equal distances so that when the pointer is moved in register with the numeral "5" the blades will then have been adjusted concentrically to their maximum outward positions relative to the center of the passage through the controller and through the transmitter. When the pointer is moved in register with the indicating numeral "1" the blades will have been adjustably moved to closed positions across the passage, and when the pointer is swung to the intermediate numerals each will indicate that the blades have been swung to the desired partly open positions. The volume of sound aero-impulses will thereby be regulated for rendering the playing of the subject matter of the records in low, medium or loud tones, and the adjustments of the pointer and disk 27 may be readily accomplished manually by operating the handle, as 35, which is provided on the pointer.

While in the foregoing description, I have embodied the preferred form of my invention, I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. In combination with the tone-arm of a phonograph transmitter, a sound regulator, comprising an annular supporting plate fixed across the passage of the tone-arm between its outlet and the reproducer, overlapping annular disposed arcuate blades having one of their corresponding ends pivoted in concentric arrangement adjacent the marginal edge of the opening of said plate whereby the other ends of the blades may be simultaneously adjusted concentrically relative to the center of the passage of the tone-arm for varying circumferentially the course leading from the reproducer to the outlet of the tone-arm, a scale on the exterior of the tone-arm, having spaced indicating symbols, and means operative exteriorly of the tone-arm for adjusting the other ends of the blades in unison concentrically according to the symbols of the scale.

2. In combination with the tone-arm of a phonograph transmitter, a sound wave regulator, comprising an annular supporting plate fixed across the pasage of the tone-arm between its outlet and the reproducer, overlapping annularly disposed arcuate blades having one of their corresponding ends pivoted in concentric arrangement adjacent the marginal edge of the opening of said plate whereby the other ends of the blades may be simultaneously adjusted concentrically relative to the center of the passage of the tone-arm for varying circumferentially the course leading from the reproducer to the outlet of the tone-arm, an annular disk rotatable in the passage of the tone-arm on the faces of the blades opposite to the supporting plate and the disk having in its inner edge spaced slots in each of which the second end of each of the blades is slidably pivoted, a scale on the exterior of the tone-arm, having spaced indicating symbols, and a pointer operative exteriorly of the tone-arm for rotatably adjusting the disk to move the blades in unison concentrically according to the symbols of the scale.

This specification signed and witnessed this 30th day of April A. D. 1923.

FREDERICK W. HOCHSTETTER.